Aug. 8, 1933.  H. G. COULSON  1,921,347
LIQUID FEEDER
Filed May 23, 1930  2 Sheets-Sheet 1
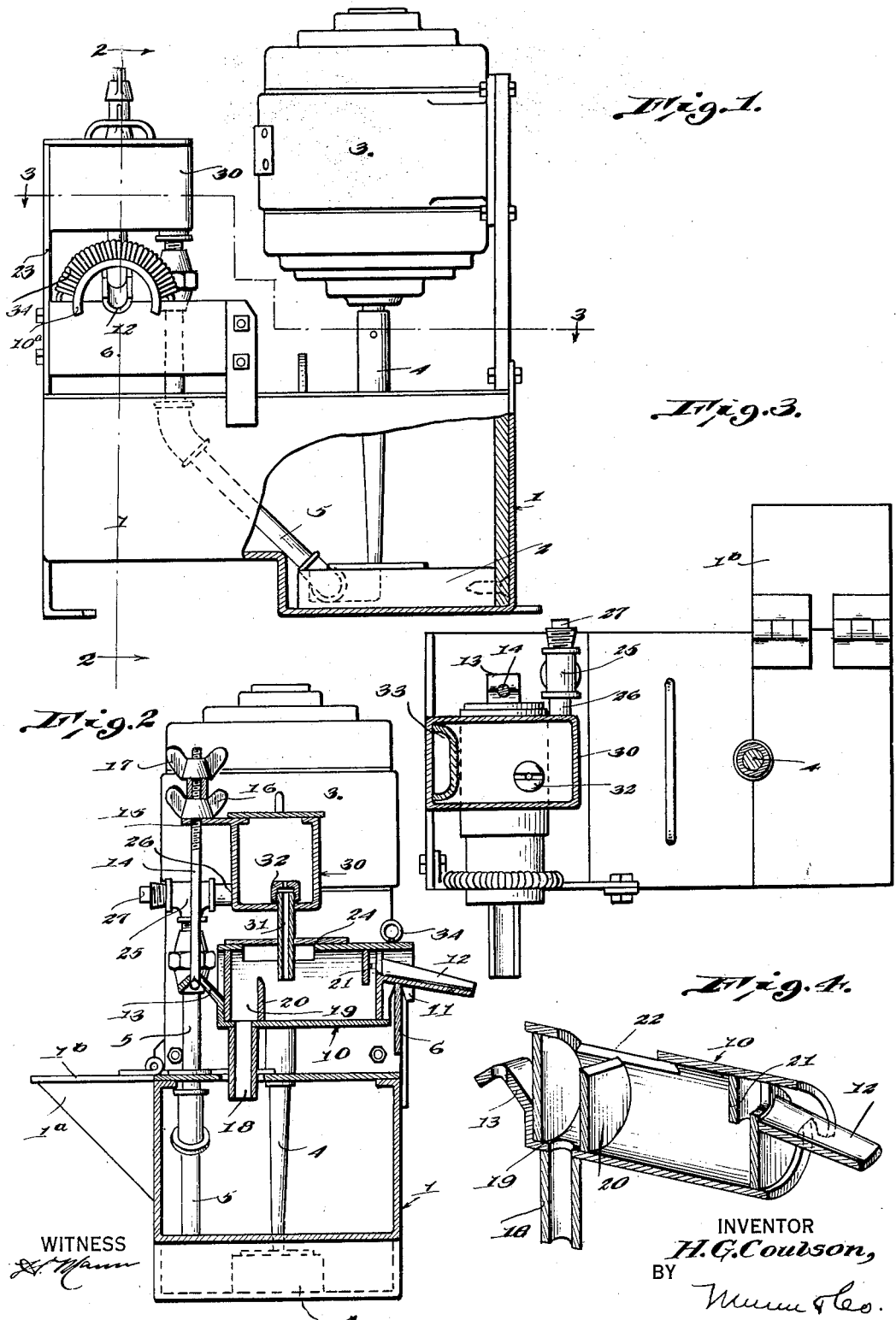

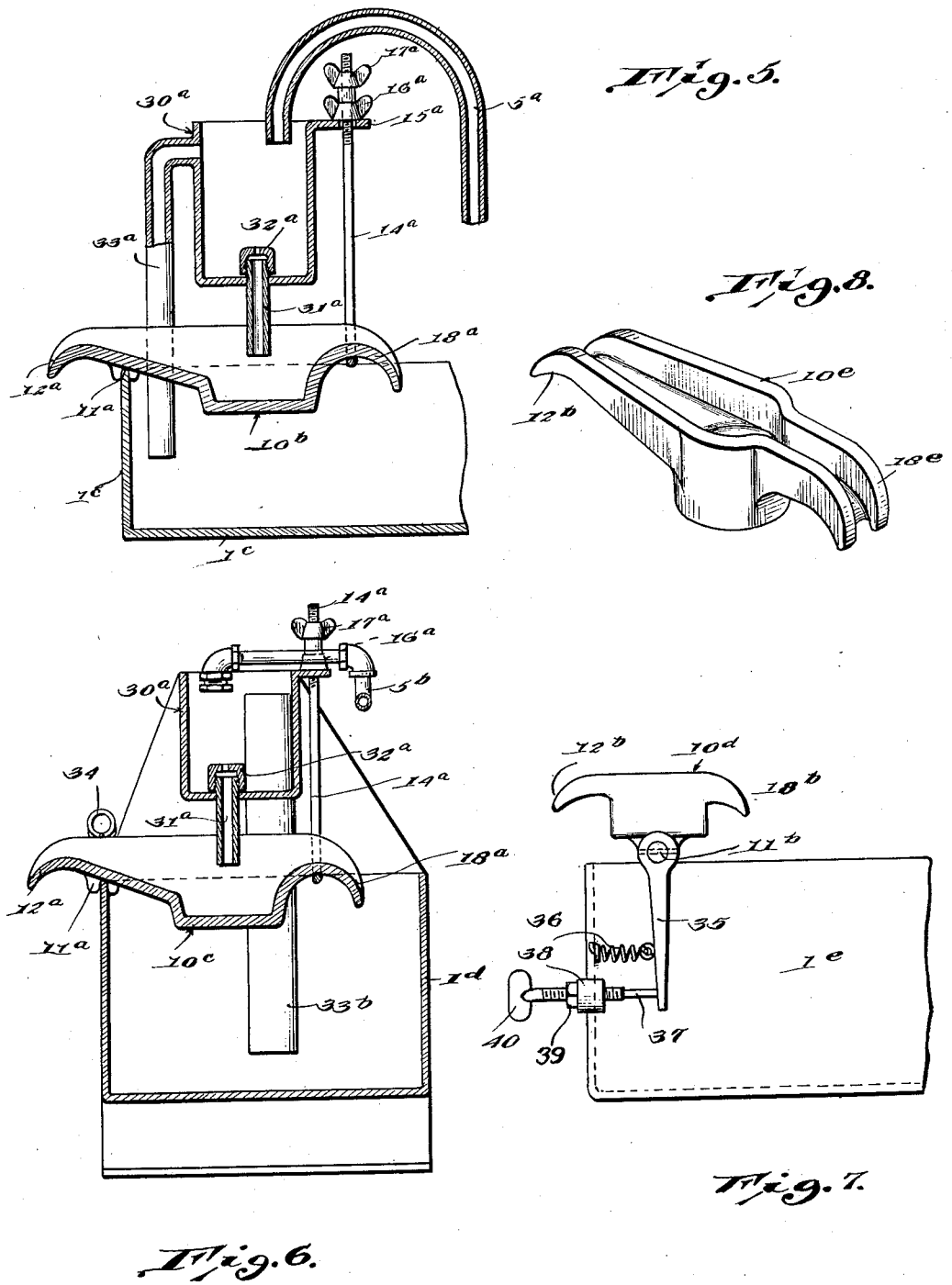

Patented Aug. 8, 1933

1,921,347

UNITED STATES PATENT OFFICE 1,921,347

LIQUID FEEDER

Harry G. Coulson, Wallace, Idaho

Application May 23, 1930. Serial No. 455,120

3 Claims. (Cl. 137—166)

This invention relates to liquid feeders and more particularly to what may be termed precision liquid feeders.

A primary object of the invention is to so construct a feeder that after once being set it will continuously feed an unvarying quantity of liquid and which may be adjusted to feed any desired amount, the feeder having a micrometer adjustment which greatly increases its effectiveness.

Another object of the invention is to provide an apparatus of this character with a multiple feed which provides for the use of a small tank and small tilting cups adapting it for use as a lubricator interchangeably with mechanical lubricators with the advantage that it has no plunger pumps or valves which are subject to wear.

Another object is to construct a feeder of this character so that the feed adjustment may be quickly and accurately made; which is economical to operate and the extreme simplicity of which results in freedom from operating trouble and thereby promotes long life to the apparatus.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a front elevation of one form of feeder embodying this invention, the parts broken out and in section;

Fig. 2 is a vertical section thereof taken on the line 2—2 of Fig. 1;

Fig. 3 is a horizontal section taken on the line 3—3 of Fig. 1;

Fig. 4 is a detail longitudinal section on the feed cup or vessel used in this form of the invention;

Fig. 5 is a vertical section showing a slightly different form of feeder;

Fig. 6 is a similar view showing still another form of the invention.

Fig. 7 is a detail sectional view showing another means for adjusting the feed cup to vary the quantity feed; and Fig. 8 is a perspective of the feed cup used in the form shown in Figs. 5 and 6.

This feeder which is especially designed for use in re-agent feeding comprises a main liquid containing vessel or tank 1 and in the form shown in Figs. 1 to 4 has a motor driven pump 2 mounted therein, the motor being shown at 3 and the driving shaft for the pump at 4. This form of the invention is of the enclosed type and is designed for use for small quantity feeding of liquids such as those which readily emulsify and those which are subject to oxidation or rapid deterioration on exposure to the air. The motor 3 may be of any suitable or desired construction being preferably a single phase 60 cycle motor complete with combined starting switches and overload circuit breaker, the details of which are not shown since they constitute no part of the invention.

Mounted above the closed tank 1 is a spout cup 10 the pivot or fulcrum of which is located at 11 on an upstanding plate 6 carried by the tank 1 and which is here shown located just below the inner end of the discharge spout 12 of said cup. At the diametrically opposite side of the cup 10 is a laterally extending apertured plate or lug 13 designed to receive an adjusting rod 14 which extends upwardly and is passed through a laterally extending plate 15 from a liquid supply vessel 30 mounted above the cup 10 and into which is discharged the liquid from the pump 2 through pipe 5. The cup adjusting rod 14 is finely threaded at its upper portion and has mounted thereon beyond the plate 15 an adjusting nut 16 and a lock nut 17. It is obvious that the raising or lowering of rod 14 will vary the tilting or angular position of the cup 10 and thereby control the quantity of liquid which is permitted to pass out of the spout 12.

The tiltable spout cup 10 has at the side opposite to that which carries the spout 12 a discharge pipe 18 which discharges the overflow from the cup into tank 1 as shown clearly in Fig. 2. This pipe 18 leads from an open top chamber 19 at the end of cup 10 and which is formed in the cup by an upstanding partition 20 over which the liquid flows when it reaches a level in the cup proximating the top of said partition and passes out through chamber 19 and pipe 18 which constitutes an overflow for the cup. This partition 20 has its upper edge spaced some distance below the top of the chamber 19 to provide for an unobstructed flow of the liquid and prevent clogging by sediment and the like.

The discharge spout 12 is located at the end opposite to that carrying spout 18 near the top of the cup. Adjacent the inner end of spout 12 and spaced slightly therefrom is a baffle plate 21 which depends from the top of the cup and extends below the liquid level of the cup so that the outflow through the spout 12 will not be agitated and disturbed by the entering fluid which flows into the cup through a pipe 31 leading from the bottom of the tank or vessel 30 and also to seal the interior of cup 10 against outside air. Pipe 31 is provided on its inner end within the tank 30 with an apertured cap 32, a plurality of these caps being provided for the apparatus having apertures of different sizes so that they may be interchanged to vary the outflow of liquid through the pipe 31 to the cup 10.

The top of the cup 10 has a comparatively large opening 22 formed therein to permit the pipe 31 to extend into said cup and not interfere with the tilting of the cup which is necessary incident to the setting of the cup to discharge the desired amount of liquid through the spout 12.

The tank 30 is supported on a suitable supporting structure here shown in the form of an upstanding plate or standard 23 carried by tank 1. A saddle plate 24 rests by gravity upon cup 10 and overlies the opening 22 in the cup 10 so as to form a closure for said opening without interfering with the movement of the cup during its adjustment.

The upper end of pipe 5 has a T-coupling 25 with a short pipe 26 leading from one arm thereof and discharging into the tank or vessel 30 while a plug 27 is arranged in the other arm to facilitate cleaning of the pipe when necessary.

This tank 1 is provided with a filling spout 1a having a hinged cover 1b shown clearly in Figs. 2 and 3 and located at one side thereof.

It is of course understood that the various parts of the apparatus may be constructed of any suitable or desired material and when acids are to be used in the vessels and tubes they may be constructed of stone ware and glass to avoid deterioration of the acids.

In the use of the apparatus as shown and described above the motor is set in operation to actuate the pump 2 which raises the liquid in tank 1 through pipe 5 and discharges it into the vessel or chamber 30. The overflow from vessel 30 passes out through pipe 33 and the liquid flows downward through the tube or pipe 31 into the tilting vessel or cup 10, the flow through said tube being controlled by the size of the aperture in the cap 32 which as above described is changeable to vary the quantity passing through the tube. The pump is set to supply to chamber or vessel 30 more liquid than the outlet tube 31 will carry which causes more or less liquid to overflow continuously through the pipe 33 to the tank 1. This arrangement maintains a level in the vessel 30 and insures a constant flow through the tube 31. The liquid in the tilting cup 10 flows out through spout 12 and over the baffle 20 into the overflow pipe 18 and passing through said pipe is discharged into the tank 1 as is shown clearly in Fig. 2. The liquid flowing from spout 12 passes on to use in the process for which it is required.

From the above description it will be obvious that by adjustment of the nuts 16 and 17 on the rod 14 the position of the cup 10 may be varied to its fulcrum 11 and thereby control the flowing over or through spout 12 of any desired amount from the smallest quantity to the full amount flowing into the vessel 10. As the quantity flowing into the cup 10 is constant so also the quantity flowing over spout 12 and through pipe 18 is also constant for each adjusted position of cup 10.

Since the spout 12 is open on top it is practically impossible for sediment to choke the flow even with the finest feeds, such choking frequently occurring in other feeding devices when a very small amount of liquid is passed through a nearly closed valve.

In the form shown in Fig. 5 the tank 1c is similar to tank 1 of the figures above described except that it is open at its top, this form of the invention being termed the open type feeder. The tilting cup 10b is fulcrumed on the upper edge of one side of the tank 1c as shown at 11a and the tilting cup or vessel 10b is made also open having an overflow spout 18a and a discharge spout 12a through which the liquid to be used in the process is passed. The tank 30a which supplies the tilting cup 10b is supported above said cup and has an open top with a discharge tube 31a leading from the lower portion thereof and discharging into the cup 10b, said tube being provided with an apertured cap 32a which obviously may be changed to a similar cap having a different size aperture for varying the amount of fluid passed through pipe 31a as is the case in the other form of the invention above described.

An overflow pipe 33a leads from a point near the top of the vessel 30a and discharges into the tank 1c.

A supply pipe 5a here shown in the form of a goose neck discharges into the upper open end of the tank 30a and the liquid fed therethrough may be raised by any suitable means.

An adjusting rod 14a has one end passed under and engaged with the curved discharge spout 18a and the other end is threaded and extended through a laterally projecting flange or plate 15a carried by the tank 30a. This rod 14a is equipped with the adjusting nut 16a and lock nut 17a the same as in the other figures, and by adjusting these nuts the tilting of the cup 10b is regulated to discharge more or less liquid through spout 12a.

In the form shown in Fig. 6 the parts are the same as shown in Fig. 5 except that the supply for tank 30a is slightly different and the overflow pipe 33b instead of opening through one side wall of the tank 30a as in Fig. 5 extends up through the bottom of the tank 30a to a point near the top. The supply pipe 5b which receives liquid from any suitable source discharges into tank 30a through the open top thereof and the tank operates in the same manner as those above described.

In all forms of the invention a coiled spring 34 is shown for holding the tilting cup 10c on its fulcrum.

In Fig. 7 a slightly different form of adjustment for the tilting cup is shown. The tank 1e is the same as the others being of the open type form and pivotally mounted above the tank is the tilting cup 10d, the pivot 11b of which is shown at the bottom thereof and depending from the cup is an arm 35 connected by a coiled spring 36 with a lug on tank 1e while engaged with the lower end of said arm in advance of said spring is an adjusting rod or screw 37 which is threaded through a boss 38 on the side wall of the tank and has a lock nut 39 for holding it in adjusted position. This rod is preferably provided with a finger grip 40 to facilitate its operation. This rod provides a very fine micrometer feed adjustment for varying the amount of liquid to be discharged through spout 12b, the overflow spout 18b being shown arranged to discharge into the tank 1e.

In Fig. 8 the tilting cup is made of porcelain or glass and numbered 10e and is similar to the other forms above described except that it is made comparatively small and the spout members shallow but it is designed to be supported and mounted in the same manner as that shown in Figs. 5 and 6.

It will thus be seen that the liquid to be used, which is usually supplied from tanks 1, 1c, 1d, or 1e according to the type of feeder used, is raised to the cup or tank 30, or 30a by any suitable lifting means operated in any suitable manner and from said cup is fed through the discharge pipe or tube leading from the bottom thereof into the tilting cup below it and as the quantity flowing into said cup is constant so also are the quantities flowing out therefrom through the discharge and overflow spouts, the quantity discharged being regulated by the position of the cup. It will thus be seen that the feed after the cup has once been set will be continuous and constant and that the adjustment may be very quickly made. It is also obvious that the apparatus need not be lined up in any particular direction, but just placed most conveniently and connected with the operating mechanism for raising the liquid which may be a motor operated pump as shown in Figs. 1 to 3 or by any other suitable means.

In Figs. 5 to 7 the various tilting cups have their overflow and discharge spouts made respectively one with an elongated gradual upward incline and the other curved abruptly so that the exit of the overflow will be in a higher plane than that of the discharge spout causing the liquid to flow continuously thru the discharge spout when the cup is set and preventing it from flowing thru the overflow spout until it reaches a point considerably higher than the discharge spout.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

1. A feed cup for a liquid feeder comprising a body portion having oppositely extending discharge spouts, means on one of said spouts to mount said cup for tilting movement, and means engaged with the other spout for adjusting the cup to vary liquid fed therefrom.

2. In a liquid feeder, a liquid containing vessel, an elongated liquid receiving cup fulcrumed on a wall of said vessel, said cup having a spout projecting beyond the wall for discharging liquid outside of the vessel, and a spout at the opposite end for discharging liquid into the vessel, and means including a threaded adjusting rod loosely connected with the end of the cup opposite the first mentioned spout, a stationary member, said rod passing through said stationary member, and an adjusting nut carried by the rod and bearing on the upper face of said stationary member.

3. In a liquid feeder, a liquid containing vessel, an elongated liquid receiving cup fulcrumed on a wall of said vessel, said cup having a spout projecting beyond the wall for discharging liquid outside of the vessel, and a spout at the opposite end for discharging liquid into the vessel, means including a threaded adjusting rod loosely connected with the end of the cup opposite the first mentioned spout, a stationary member, said rod passing through said stationary member, an adjusting nut carried by the rod and bearing on the upper face of said stationary member, and means carried by the rod for locking the adjusting nut in position.

HARRY G. COULSON.